United States Patent [19]

Nace

[11] Patent Number: 4,624,972
[45] Date of Patent: Nov. 25, 1986

[54] GAMMA RADIATION RESISTANT CARBONATE POLYMER COMPOSITIONS

[75] Inventor: Vaughn M. Nace, Lake Jackson, Tex.

[73] Assignee: The Dow Chemical Company, Midland, Mich.

[21] Appl. No.: 801,351

[22] Filed: Nov. 25, 1985

[51] Int. Cl.$^4$ .......................... C08K 5/12; C08L 69/00
[52] U.S. Cl. .................................... 523/136; 524/292; 524/611; 560/85
[58] Field of Search ................ 523/136; 524/292, 611; 560/85

[56] References Cited

U.S. PATENT DOCUMENTS 3,186,961 6/1965 Sears ..................................... 524/611
4,123,436 10/1978 Holub ................................... 524/611

FOREIGN PATENT DOCUMENTS 0152012 8/1985 European Pat. Off. .
53-127551 11/1978 Japan .................................... 524/292

Primary Examiner—C. Warren Ivy
Attorney, Agent, or Firm—B. G. Colley

[57] ABSTRACT

Carbonate polymer compositions are rendered gamma ray resistant by the incorporation of 0.1 to 10 percent by weight of the esters of aromatic polycarboxylic acids such as terephthalic, isophthalic, phthalic, trimellitic, hemimellitic, trimesic, and prehnitic acids with the monoalkyl or monoaryl ethers of polyglycols. The compositions have reduced yellowing after exposure to cobalt 60 radiation.

7 Claims, No Drawings

GAMMA RADIATION RESISTANT CARBONATE POLYMER COMPOSITIONS

BACKGROUND OF THE INVENTION

This invention relates to a gamma radiation resistant carbonate polymer composition wherein the polycarbonate polymer is rendered radiation resistant by the incorporation of an effective amount of one or more esters of an aromatic poly carboxylic acid with monoalkyl or monoaryl ethers of polyglycols.

There is a distinct need for polycarbonate moldings that are resistant to gamma radiation so that they can be sterilized without substantial loss of clarity and physical characteristics.

It is known that polyolefins can be rendered radiation resistant by the addition of benzhydrol, hydrocarbon oils, phthalic esters, and benzaldehyde acetals. See for example U.S. Pat. Nos. 4,431,497, 4,460,445; and 4,467,065.

It is also known that blends of polycarbonate resins and polyethylene terephthalate are resistant to gamma rays. Modern Plastics January 1984 page 104; Plastics World December 1983 pages 68 and 69.

SUMMARY OF THE INVENTION

The present invention is a carbonate polymer having improved gamma radiation stability due to the incorporation of one or more esters of an aromatic polycarboxylic acid in an effective amount sufficient to improve the gamma radiation resistance.

The esters used herein have the formula

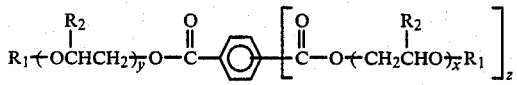

wherein $R_1$ is a phenyl radical or aliphatic hydrocarbon radical having one to eight carbon atoms; $R_2$ is either hydrogen or a methyl radical; x and y are independently 2, 3 or 4; z is 1, 2 or 3.

In general, this effective amount has been found to be in the range from 0.1 to 10 percent by weight. A preferred range is 0.5 to 5.0 weight percent and the most preferred range is 1.0 to 4.0 weight percent.

DETAILED DESCRIPTION OF THE INVENTION

The carbonate polymers employed in the present invention are advantageously aromatic carbonate polymers such as the trityl diols carbonates described in U.S. Pat. Nos. 3,036,036, 3,036,037, 3,036,038 and 3,036,039, polycarbonates of bis(ar-hydroxyphenyl)-alkylidenes (often called bisphenol-A type diols) including their aromatically and aliphatically substituted derivatives such as disclosed in U.S. Pat. Nos. 2,999,835, 3,038,365, and 3,334,154, and carbonate polymers derived from other aromatic diols such as described in U.S. Pat. No. 3,169,121.

It is understood, of course, that the polycarbonate may be derived from (1) two or more different dihydric phenols or (2) a dihydric phenol and a glycol or a hydroxy-or acid-terminated polyester or a dibasic acid in the event a carbonate copolymer or interpolymer rather than a homopolymer is desired. Also suitable for the practice of this invention are blends of any one of the above carbonate polymers. Also included in the term carbonate polymer are the ester/carbonate copolymers of the types described in U.S. Pat. Nos. 3,169,121, 4,287,787, 4,156,069, 4,260,731 and 4,105,633. Of the aforementioned carbonate polymers, the polycarbonates of bisphenol-A and derivatives, including copolycarbonates of bisphenol-A, are preferred. Methods for preparing carbonate polymers for use in the practice of this invention are well known, for example, several suitable methods are disclosed in the aforementioned patents which are hereby incorporated by reference in their entirety.

The esters of aromatic polycarboxylic acids used in this invention can be prepared by the transesterification of dimethyl terephathate with a mixture containing the monoakyl or monoaryl ethers of triethylene glycol and tetraethylene glycol or by the direct esterification of trimellitic anhydride with the same mixture of glycols. Typical preparations are set forth below. A more detailed preparation of these esters is set forth in U.S. Ser. No. 640,072 filed Aug. 10, 1984 which is incorporated by reference herein.

Similar results are obtained with hemimellitic acid esters, hemimellitic anhydride, trimesic acid esters, phthalic acid esters, isophthalic acid esters, and prehnitic acid esters.

The following examples and preparations are presented to illustrate but not limit the invention.

PREPARATION I

Preparation of a Mixed Terephthalate Composition by Transesterification

A three-necked one-liter flask, equipped with a mechanical stirrer, a thermometer and a condensation apparatus, each of which was fitted into a separate neck by way of an adapter, was used as a reaction apparatus. The consdensation apparatus had a second end remote from the flask. A dual purpose line connected to a vacuum pump and to a gaseous nitrogen source was also connected to the second end of the condensation apparatus. The flask was heated with a heating mantle controlled by a rheostat temperature controller.

A reaction mixture of 194 grams (1.0 mole) of dimethyl terephthalate, 587.5 grams (2.5 moles) of a mixture of alkylene glycol monoalkyl ethers and alkylene glycols, and 0.5 grams of calcium acetate were placed in the one-liter flask. The mixture of glycols and ethers which contained about 78 percent triethylene glycol butyl ether, about 12 percent tetraethylene glycol butyl ether, about 3 percent triethylene glycol, about 1 percent tetraethylene glycol and about 6 percent of a number of higher glycols and ethers, was commercially available from the Dow Chemical Company under the trade designation DOWANOL ® TBH.

The reaction mixture was heated, with stirring to a set temperature of about 235° Centigrade at which point the reaction mixture was boiling and evolving methanol with the aid of a gaseous nitrogen purge. After removal of about 58 grams of methanol, equivalent to a conversion of about 90 percent, the reaction apparatus was placed under a reduced pressure of about 200 millimeters of mercury. The reduced pressure was maintained at that level for a period of 5 hours after which a reaction product generally free of methanol remained.

After removal of the methanol, some unreacted starting material (mixture of alkylene glycol monoalkyl ethers and alkylene glycols) remained. The reaction apparatus was placed under a reduced pressure of less than about 5 millimeters of mercury to remove most of the unreacted starting material. The reaction apparatus was then placed under atmospheric pressure in order to allow aqueous extraction of additonal unreacted starting material and to provide a purified reaction product.

Aqueous extraction was accomplished by adding, with stirring, 400 grams of distilled water to the reaction product. Stirring was then stopped and the contents of the flask were allowed to separate into two layers, an aqueous layer and a product layer. After decanting to remove most of the aqueous layer, the product layer was dried at a temperature of 120° centigrade with a gaseous nitrogen purge to remove residual water.

The dried product layer was analyzed with a high pressure liquid chromatograph, commercially available from IBM Corporation under the trade designation HPLC-9533.

The analysis showed that the dried product layer comprised a mixture of terephthalic acid diesters, oligomers and a minor amount of starting material. The mixture of diesters was represented by the general formula

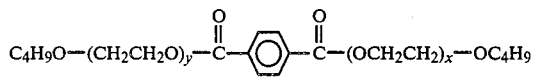

wherein x is 3 or 4 and y is 3 or 4.

PREPARATION II

Preparation of a Mixed Trimellitate Composition by Direct Esterification

A three-neck one-liter flask, equipped with a mechanical stirrer, a thermometer and a Dean Stark trap, each of which was fitted into a separate neck by way of a stopper, was used as a reaction apparatus. The flask was heated with a heating mantle controlled by a rheostat temperature controller.

A reaction mixture of 192 grams (1.0 mole) of trimellitic anhydride, 928 grams (4 moles) of a mixture of alkylene glycol monoalkyl ethers and alkylene glycols, 15.0 grams of toluene sulfonic acid monohydrate, and 100 grams of toluene were placed in the one-liter flask. The mixture of glycols and ethers was identical to that used in Preparation I.

The reaction mixture was heated, with stirring, to an initial set temperature of 150° Centigrade at which point esterification of the trimellitic acid began. As the esterification reaction proceeded, the reaction mixture was heated by the heating mantle in incremental steps to a temperature of 190° Centigrade. During the reaction water formed as a by-product, was removed via the trap by azeotropic distillation with toluene. The reaction was continued until a free acid content of less than 0.1 percent, as determined by titration with 0.1N NaOH was attained.

The toluene sulfonic acid, which was used as a catalyst, was inactivated by reaction with excess ammonium bicarbonate after the reaction mixture had cooled to a temperature of from about 125° to about 135° Centigrade. The reaction produced an insoluble ammonium sulfonate salt. The reaction mixture was then filtered to remove the insoluble salt. The filtered reaction apparatus under a reduced pressure of 100 millimeters of mercury and maintained at a temperature 135° Centigrade for a period of time sufficient to remove generally all toluene therefrom. The reaction apparatus was then placed under a reduced pressure of about 5 millimeters of mercury at a temperature of 235° Centigrade to distill off excess glycol ether and leave a product. The reaction apparatus was then placed under atmospheric pressure in order to allow aqueous extraction of additional unreacted starting material and to provide a purified reaction product.

EXAMPLES 1-3

To ascertain the effect of diester loading on the yellowing of polycarbonate after exposure to gamma radiation, a level-study was undertaken in which levels of 1.0, 2.0, and 3.3 weight percent of the plasticizer of Preparation I was added to a polycarbonate resin. The compounding was affected by weighing the appropriate amount of resin and plasticizer to give a 1500 g sample for each loading level. The ester was dispersed onto the pellets using a paint shaker lined with polyethylene bags. After a 5 minute shaking period, the coated resin was extruded on a one inch, single-screw extruder having a barrel temperature of 550° F. and screw speed of 100 R.P.M. The barrel was vented to the atmosphere. The strand chopped pellets were molded on a 18-ton injection molding machine having a barrel temperature of 575° F. and mold temperature of 170° F. The parts (optical discs of 2 inch diameter and ⅛ inch thick) were then subjected to 2.5 to 2.7 Mrad Cobalt-60 gamma radiation and the change in yellowness index was measured (ASTM method D-1925). The measured variables is shown in Table I.

TABLE I

| SAMPLE | WEIGHT % ESTER | YI INITIAL | YI FINAL | Δ YI | % REDUCT |
|---|---|---|---|---|---|
| Control A | 0 | 3.77 | 20.74 | 16.97 | |
| Ex. 1 | 1.0 | 3.66 | 15.55 | 11.89 | 29.9 |
| Ex. 2 | 2.0 | 3.31 | 12.54 | 9.23 | 45.6 |
| Ex. 3 | 3.3 | 3.02 | 10.12 | 7.10 | 58.2 |

EXAMPLES 4-6

A similar level-study was performed using lower levels of the diester plasticizer. The formulation compounding differed in that the coated resin was dried for 3 hours in a 140° C. forced-air oven before extrusion on a non-vented extruder. Radiation dosage was 2.9 to 3.0 Mrad. The results are set forth in Table II.

TABLE II

| SAMPLE | WEIGHT % ESTER | YI INITIAL | YI FINAL | Δ YI | % REDUCT |
|---|---|---|---|---|---|
| Control B | 0 | 3.26 | 19.90 | 16.64 | |
| Control B-1 | 0.055 | 3.26 | 20.47 | 17.21 | 0* |
| Ex. 4 | 0.11 | 3.22 | 19.51 | 16.29 | 2.1 |
| Ex. 5 | 0.55 | 3.03 | 16.85 | 13.82 | 16.9 |
| Ex. 6 | 1.10 | 2.95 | 14.82 | 11.87 | 28.6 |

*Due to experimental error this run shows an increase in YI over the control.

EXAMPLES 7-9

Following the procedures of example 1, the trimellitate ester of Preparation II was used at various levels to make a polycarbonate blend. Optical discs were prepared and subjected to 2.85 Mrad of Cobalt 60 gamma radiation. The results are shown in Table III.

TABLE III

| SAMPLE | % ESTER | YI INITIAL | YI FINAL | Δ YI | % REDUCT |
|---|---|---|---|---|---|
| Control C | 0 | 3.06 | 29.02 | 25.96 | |
| Ex. 7 | 0.5 | 3.08 | 19.91 | 16.83 | 35.2 |
| Ex. 8 | 1.0 | 3.77 | 15.31 | 11.54 | 55.5 |
| Ex. 9 | 3.0 | 4.79 | 10.62 | 5.83 | 77.5 |

Controls Using Alkyl Esters

In order to illustrate the necessity of having the tri- and tetraethylene glycolic ester ethers for protection against gamma-ray yellowing, an aliphatic phthalate and trimellitate were each melt-blended with bisphenol-A polycarbonate at a 1.5% by weight level.

The esters used were made by Exxon Chemicals under the name JAY FLEX ® and are named triisononyl trimellitate (TINTM) and ditridecyl phthalate (DTDP). The table below lists the effectiveness of these loadings of said compounds as anti-yellowing agents after 2.85 Mrad gamma irradiation.

TABLE IV

| SAMPLE | % ESTER | YI INITIAL | YI FINAL | Δ YI | % REDUCT |
|---|---|---|---|---|---|
| Control D | 0 | 3.47 | 19.03 | 15.56 | |
| Control E (TINTM) | 1.5 | 4.41 | 17.30 | 12.89 | 17.2 |
| Control F (DTDP) | 1.5 | 3.61 | 16.27 | 12.66 | 18.6 |

I claim:

1. A carbonate polymer composition with improved resistance to gamma radiation which comprises a carbonate polymer and a gamma radiation resistance improving amount of an ester of an aromatic acid having the formula

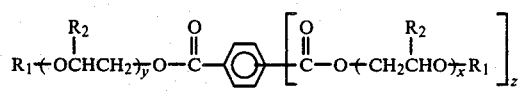

wherein $R_1$ is a phenyl radical or aliphatic hydrocarbon radical having one to eight carbon atoms; $R_2$ is either hydrogen or a methyl radical; x and y are independently 2, 3 or 4; z is 1, 2 or 3.

2. A carbonate composition as set forth in claim 1 wherein the amount of said ester is in the range from 0.1 to 10.0 weight percent.

3. The composition as set forth in claim 1 wherein z is one.

4. The composition as set forth in claim 1 wherein z is two.

5. The composition as set forth in claim 1 wherein z is 3.

6. A carbonate polymer composition comprising a carbonate polymer and 0.1 to 10.0 weight percent of the terephthalic acid diester of polyethylene glycol monobutyl ether.

7. A carbonate polymer composition comprising a carbonate polymer and 0.1 to 10.0 weight percent of the trimellitic acid triester of polyethylene glycol monobutyl ether.

* * * * *